Feb. 27, 1962  F. L. DAVIS  3,022,875
OVER-RUNNING CLUTCH AND BEARING STRUCTURE
Filed March 15, 1957  2 Sheets-Sheet 1

INVENTOR
F. L. DAVIS

BY  *Lyon & Lyon*
ATTORNEYS

Feb. 27, 1962    F. L. DAVIS    3,022,875
OVER-RUNNING CLUTCH AND BEARING STRUCTURE
Filed March 15, 1957    2 Sheets-Sheet 2

INVENTOR
F. L. DAVIS

BY
*Lyon & Lyon*
ATTORNEYS

United States Patent Office 3,022,875
Patented Feb. 27, 1962

3,022,875
OVER-RUNNING CLUTCH AND
BEARING STRUCTURE
Frederick L. Davis, Fort Worth, Tex., assignor to Halliburton Company, a corporation of Delaware
Filed Mar. 15, 1957, Ser. No. 646,466
2 Claims. (Cl. 192—45.1)

This invention relates to an over-running clutch and bearing structure.

Heretofore, there have been produced, and made available in commerce, various types of over-running or one-way clutches. However, so far as known, these clutches have not been designed to withstand axial thrust or radial bearing forces. Where axial thrust or radial bearing forces have been encountered in connection with the use of such clutches, auxiliary bearing members have been provided.

In so-called over-running sprag clutches of the known type, spring urged sprags or clutch blocks are interposed between the inner and outer rotary members of the over-running clutch. The radial dimension of the sprags is slightly greater than the distance between the inner and outer rotary clutch members. The sprags are urged by the springs to wedge between the inner and outer clutch members so that in one direction of relative rotation of the clutch members a positive clutching action is obtained. However, in the opposite direction of relative rotation of the inner and outer members, the sprags are moved against spring bias to release and allow free relative rotational movement of the inner and outer clutch members. Considerable difficulty has been encountered in properly lubricating such clutches and heating and wear have been excessive, so that such clutches have been limited in operation to very low speeds when over-running.

It is, therefore, an object of the present invention to provide an over-running clutch unit incorporating in the unit a bearing structure capable of withstanding substantial axial thrust forces and/or radial bearing forces.

Another object of the invention is to provide an over-running clutch and bearing structure in which proper lubrication of the parts of the structure is achieved.

Another object is to provide a combination over-running clutch and bearing in which the clutch blocks are of the sprag type.

Another object is to provide an over-running clutch and bearing combination utilizing either roller bearings or ball bearings with sprag clutch blocks or various combinations of these elements.

Another object of the invention is to provide an over-running clutch and bearing assembly utilizing sprags that are balanced in such a way that centrifugal force and/or inertia is utilized to energize the clutch instead of the springs heretofore used for biasing the sprags.

Another object of the invention is to provide an over-running clutch and bearing unit wherein the sprags move at a fixed ratio of speed with respect to the inner and outer clutch members to provide minimum wear of the sprags and clutch members. In units of practical proportions, the sprags are constrained to move in a planetary relation to the inner and outer clutch members at about one-half the relative rotational speed of the members.

The objects of the invention as hereinbefore stated and as will appear hereinafter, are realized in an over-running clutch and bearing structure including an inner race, an outer race concentric therewith, a plurality of arcuately spaced bearings rotatingly supporting the outer race on the inner race, and a plurality of sprags acting between the inner and outer races.

The bearings are preferably either roller bearings or ball bearings which may be maintained in arcuately spaced relation between the bearing races by a cage. Preferably, the sprags are positioned between the inner and outer races in the arcuate spaces between the bearings. However, they may be disposed in other ways as will be explained more fully hereinafter. The sprags may be disposed upon axial pins carried by the cage or they may simply float in the spaces between the bearings.

The invention will be described with greater particularity and other objects and advantages will be pointed out with reference to the drawings in which.

Figure 1:
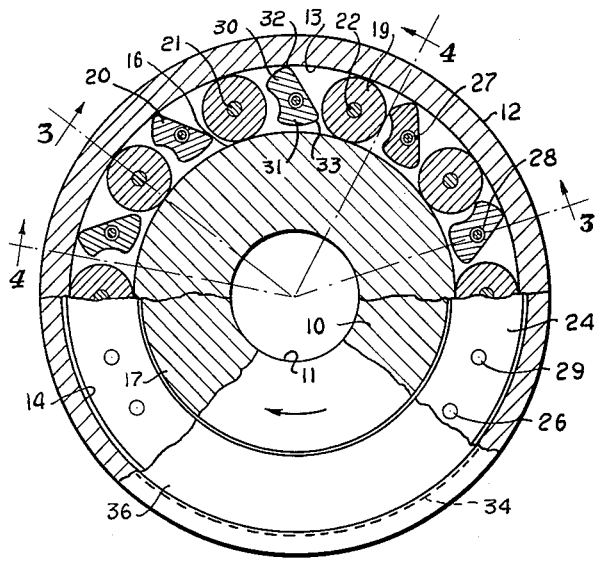
FIG. 1 is an axial view of an over-running clutch and bearing structure in accordance with the invention, parts being broken away to show interior construction, the unit being shown with its parts in over-running relation.
Figure 3:
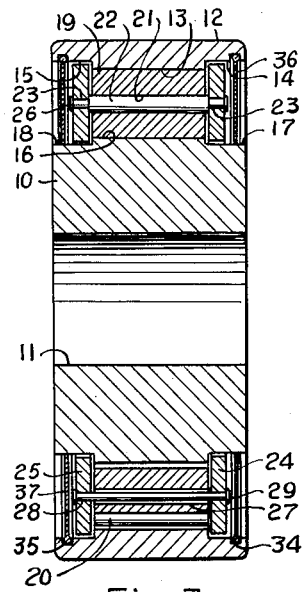
FIG. 3 is a sectional view taken along the line 3—3 of FIG. 1 looking in the direction of the arrows.

Referring to the drawings, particularly to FIGS. 1 through 4, the over-running clutch and bearing structure disclosed includes an inner race 10 having an axial shaft hole 11 into which may be fitted a shaft (not shown) that may be either a driving or driven shaft. The shaft may be secured in the hole 11 in driving relation to the inner race 10 in any desired manner as by a tight frictional fit or by the use of a conventional key and keyway (not shown).

Concentric with the inner race is an outer race 12 that is connectable to a driving or driven member, as the case may be. The outer race has an inwardly facing clutch and bearing surface 13 positioned medially of the outer race. Marginal peripheral surfaces 14 and 15 are formed at the ends of the outer race and these surfaces have a greater radius than the radius of the clutch and bearing surface 13. The clutch and bearing surface thus is formed as a raised, centrally located, internal band on the interior of the outer race.

A similar set of surfaces opposed to the corresponding surfaces of the outer race is formed on the outer portion of the inner race 10. The inner race has a raised clutch and bearing surface 16 bounded by depressed marginal surfaces 17 and 18.

The opposed clutch and bearing surfaces 13 and 16 are radially spaced apart and the annular space therebetween accommodates roller bearings 19 and clutch blocks or sprags 20. Each roller bearing has a diameter substantially equal to the radial distance between the opposed clutch and bearing surfaces 13 and 16 and a length substantially equal to the width of these clutch and bearing surfaces. Each roller bearing has an axial bearing hole 21 receiving, with a close running fit, a roller bearing shaft 22. The ends of each roller bearing shaft are reduced as shown at 23 and are received in holes formed in bearing and sprag cage rings 24 and 25. The reduced ends 23 of the roller bearing shafts are upset as shown at 26 to secure the shafts and cage rings together. It will be noted that the cage rings 24 and 25 have a running clearance from the ends of the roller bearings and from the marginal surfaces 14, 15, 17 and 18 so that the rings will run freely in the annular spaces provided between the marginal surfaces. The roller bearings 19 are spaced at equal angular distances about the unit to rotatingly support the outer race on the inner race.

The sprags 20 are disposed in the spaces between the roller bearings. These sprags have longitudinal holes 27 formed therethrough loosely receiving longitudinal sprag pins 28. The ends of the sprag pins are received in holes in the cage rings 24 and 25 and are peened over at 29 to retain them in the cage rings.

Figure 2:
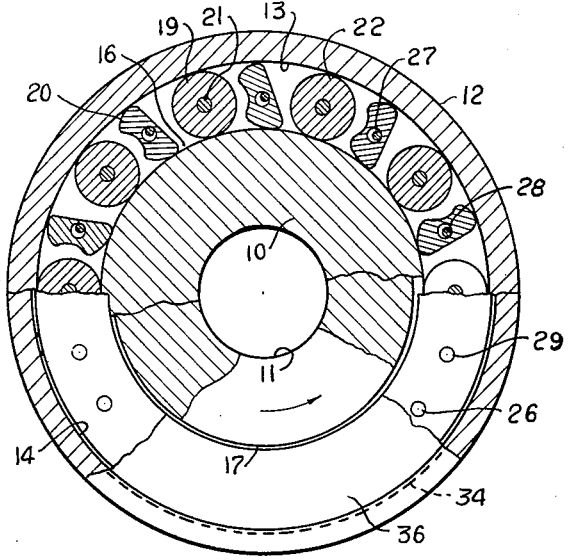
FIG. 2 is a view similar to FIG. 1 but showing the parts of the unit in clutching engagement.
Figure 4:
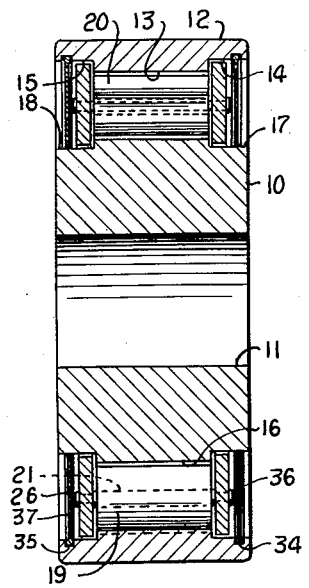
FIG. 4 is a section taken along the line 4—4 of FIG. 1.

As shown, the sprags have the same length as the roller bearings. In transverse section, as seen in FIGS. 1 and 2, the sprags are kidney shaped and each has an outer lobe 30 and an inner lobe 31. The distance from the outer extremity 32 of the outer lobe to the inner extremity 33 of the inner lobe is slightly greater than the radial distance between the clutch and bearing surface 13 of the outer race and the opposed clutch and bearing surface 16 of the inner race.

Grooves 34 and 35 are provided in the marginal surfaces 14 and 15 of the outer race 12 to receive the outer peripheries of lubricant sealing rings 36 and 27. The lubricant sealing rings are formed of flexible material, such as thin sheet metal or fibreboard or a rubber-like material such as neoprene, and are sufficiently flexible to be sprung into the grooves. The radially inward edges of the lubricant sealing rings are spaced from the marginal surfaces 17 and 18 of the inner race 10. Thus, the sealing rings are carried by and rotate with the outer race.

FIG. 1 illustrates the disposition of the parts of the unit when over-running. Let it be assumed that the outer race 12 is stationary and the inner race 10 is rotating clockwise in the direction of the arrow. Under these conditions, the roller bearings, sprags and cage are also rotating in a clockwise direction but at about one-half the speed of the inner race. As will be seen from an inspection of the uppermost sprag 20, the mass of that portion of the sprag lying to the left of the pin 28 is greater than the mass of that portion of the sprag which lies to the right of the pin. Centrifugal force acting on the sprag tends to throw it radially outwardly and to rotate it in a clockwise direction as seen in FIG. 1 to cause the outer extremity 32 to stay in contact with and to ride along the clutch and bearing surface 13 of the outer race. The inner extremity of the inner lobe is spaced from and rides clear of the clutch and bearing surface 16 of the inner race. Under these conditions, the sprags are disengaged from clutching position and the unit functions primarily as a radial bearing unit.

Now let it be assumed that the inner race continues to rotate in the direction of the arrow but that the outer race is rotated in the same direction to a speed at which it tends to overtake the inner race. As the speed of the outer race is increased to equal that of the inner race, the speed of the cage, bearing and sprag assembly gradually decreases until its speed is the same as the speed of both inner and outer races. Nevertheless, since both outer and inner races are rotating clockwise and at the same speed, centrifugal force maintains the sprags in the positions shown in FIG. 1. As the outer race overtakes the inner race, it rotates the sprags 20 clockwise on their pins and, while the outer extremities of the sprags are maintained in contact with the clutch and bearing surface of the outer race, the inner extremities 33 of the sprags are rotated clockwise on the pins 28 and into engagement with the clutch and bearing surface 16 of the inner race. In this way, the sprags are moved into clutching positions as illustrated in FIG. 2. As long as the outer race continues to tend to over-run the inner race, the sprags will be maintained in clutching positions. However, when the driving force applied to the outer race is relaxed, the inner race will over-run the outer race and the sprags will return to their disengaged positions shown in FIG. 1.

Another condition which may occur will now be explained with particular reference to FIG. 2. Let it be assumed that the outer race is stationary and that the inner race is suddenly started in rotation in a counter clockwise direction as shown by the arrow. In the rest position, one or the other of the extremities of each sprag will ordinarily be touching the corresponding clutch and bearing surface of the inner or outer race. Movement of the inner race in the direction of the arrow will thus rotate the sprags into engaged position and the outer race will be picked up and driven through the sprags by the inner race. In order to facilitate this type of clutching action, the sprags may be so designed that the outer lobe has a somewhat greater mass than the inner lobe so that starting inertia will tend to rotate the sprags in the clockwise direction about their pins as seen in FIG. 2 to cause them to assume the engaged position.

As has been indicated hereinbefore, the bearings move in planetary relation to the inner and outer races and drive the sprags and cage therewith. The angular speed of the cage, together with bearings and sprags, is about one-half the angular speed of the outer race, both speeds being considered with respect to the inner race. The cage, bearings and sprags move in the same directional sense as the outer race. The geometry of the assembly is such that, for example, where the radius of the roller is ¼" and the radius of the inner race is varied from 4 to 16 times the radius of the roller with the radius of the outer race being changed accordingly, the angular speed of the cage varies from 0.60 to 0.53 times the angular speed of the outer race. Where the radius of the inner race is greater than about 16 times the radius of the roller, the angular speed of the cage is between 0.53 and 0.50 times the angular speed of the outer race, both speeds being considered with respect to the inner race.

Figure 5:
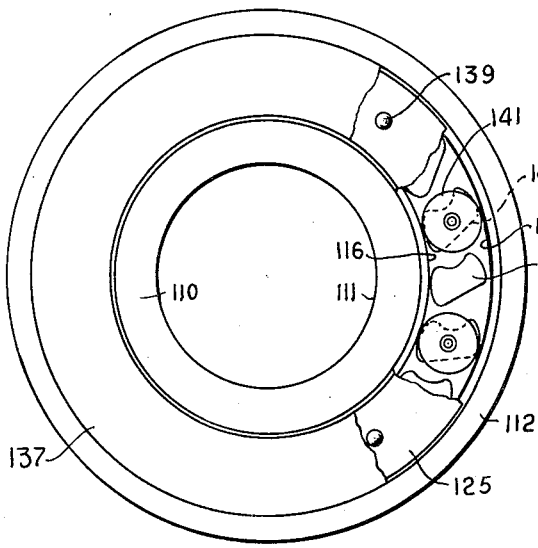
FIG. 5 is a view similar to FIG. 1 of a variant form embodying the principles of the invention.
Figure 6:
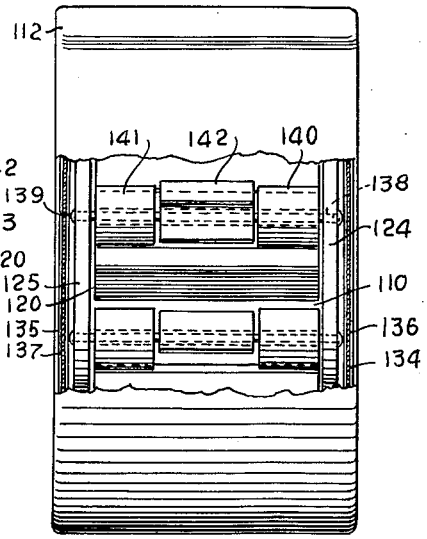
FIG. 6 is a side view of the over-running clutch and bearing unit of FIG. 5, parts being broken away to disclose interior construction.

A variant form of the invention is shown in FIGS. 5 and 6, to which reference is now made. In this form, the radial load carrying ability of the unit is reduced by reducing the aggregate bearing area while the ability of the clutch elements to transmit torque is increased by increasing the aggregate sprag area. Also, certain of the sprags are full floating, that is, they are not disposed upon longitudinal pins as are the sprags of the device of FIGS. 1 to 4. The unit of FIGS. 5 and 6 is otherwise quite similar to the unit of FIGS. 1 to 4.

Referring to FIGS. 5 and 6, the over-running clutch and bearing structure shown has an inner race 110 having a shaft hole 111, the inner race being encompassed by a concentric outer race 112 spaced therefrom. Cage rings 124 and 125, similar to the cage rings 24 and 25 of FIGS. 1 to 4, have arcuately spaced longitudinal pins 138 extending therebetween, the pins being upset at 139 over the outer surfaces of the rings. These pins carry a pair of longitudinally spaced roller bearing elements 140 and 141 disposed within the cage rings and adjacent thereto. In the space between the opposed ends of the bearing elements is disposed a sprag element 142, the sprag element having a longitudinal hole centrally thereof through which the pin 138 extends.

Sprags 120 extend the full width of the clutch and bearing surfaces 113 and 116 of the outer and inner races, respectively. However, the sprags 120 are not disposed upon longitudinal pins as in the previous example. Instead, they float freely in the spaces between the arcuately spaced bearing element and sprag element assemblies mounted on adjacent pins 138. The spacing of the pinned elements is such in relation to the size of the sprag 120 that the sprag cannot turn completely over in its pocket; it is prevented from doing so by contact with the roller bearing elements. However, sufficient space is left so that the sprag 120 can move between engaged and disengaged positions.

Lubricant sealing rings 136 and 137, like the corresponding sealing rings of the unit of FIGS. 1 to 4, are carried in grooves 134 and 135 in the outer race.

The operation of the pinned sprag elements 142 is the same as the operation of the pinned sprag 20 of the unit of FIGS. 1 to 4. The full width sprags 120 operate in a very similar manner but, instead of being translated by pins such as the pins 28 of the previous example, they are pushed by the roller bearing elements 140 and 141.

Figure 7:
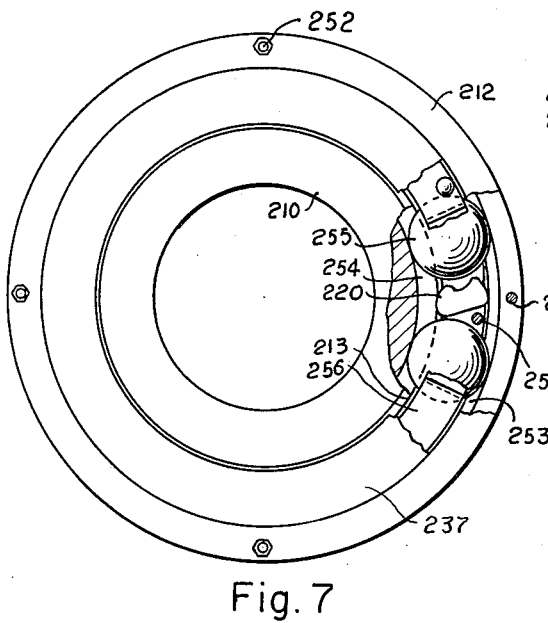
FIG. 7 is a view similar to FIG. 1 of still another variant form of the invention.
Figure 8:
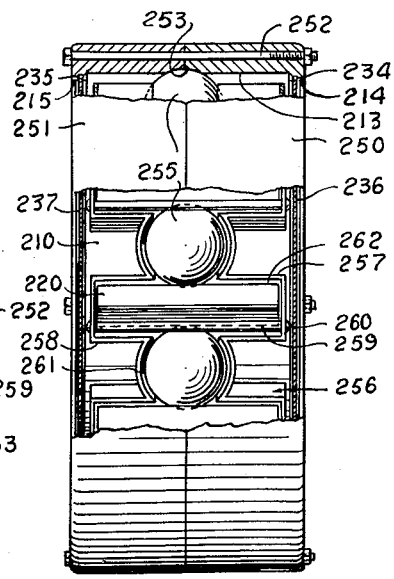
FIG. 8 is a side elevation of the over-running clutch and bearing structure shown in FIG. 7, parts being broken away to show interior construction.

Still a third variant form of the invention is shown in FIGS. 7 and 8. In this form, ball bearings are used instead of roller bearings and the sprags are full floating as in the embodiment of FIGS. 5 and 6. The form of the invention of FIGS. 7 and 8 will resist axial thrust as well as radial loads.

Referring to FIGS. 7 and 8, the over-running clutch and bearing structure shown has an inner race 210 and an outer race 212, the latter being split into two halves 250 and 251. The two halves of the outer race are held together by four bolts 252. The outer race has a peripheral ball bearing groove 253 formed in the clutch surface 213 of the outer race. The marginal peripheral surfaces 214 and 215 of the outer race are provided with grooves 234 and 235 that hold the lubricant sealing rings 236 and 237. The clutch surface 213 of the inner race has a peripheral ball bearing groove 254 that cooperates with the ball bearing groove 253 of the outer race to receive ball bearings 255.

The ball bearings are positioned in the grooves of the inner and outer races as shown in FIGS. 7 and 8. The split outer race permits easy insertion of the ball bearings in the grooves in assembling the device.

The ball bearings are held in arcuately spaced relation by means of a cage 256. The cage, as seen in FIG. 8, has a right half 257 and a left half 258 held together by pins 259 riveted to the cage halves as at 260. The cage provides ball bearing pockets 261 and wider sprag pockets 262. A sprag 220, similar to the sprag 120 of FIGS. 5 and 6, is positioned in each sprag pocket and preferably extends longitudinally for the full width of the clutch surface 213. It will be noted that the sprag floats freely in the sprag pocket and is not secured therein by a pin although it may be mounted on a pin (not shown) carried by the cage if desired.

Whereas, the outer race 212 has been shown and described as a split race, it will be understood that the inner and outer races may both be solid and of the "non-loading groove" type, or that the outer race may be solid and the inner race split.

Operation of the clutch and bearing unit of FIGS. 7 and 8 is quite similar to the operation of the previously described devices. The cage, ball bearing and sprag assembly is rotated between the inner and outer races by relative movement of the latter as hereinbefore described. When the inner race is rotated clockwise with respect to the outer race as seen in FIG. 7, over-running of the clutch occurs and the unit behaves as a ball bearing to carry axial and radial loads. When the inner race tends to rotate counter clockwise with respect to the outer race as seen in FIG. 7, the sprags 220 are rocked into a locked position between the inner and outer clutch surfaces and the outer race is picked up and driven by the inner race.

Although both roller bearing and ball bearing units are disclosed herein, it will be understood that other similar kinds of bearings and cooperating races may be employed.

The roller or ball bearings assist in attaining proper lubrication of the clutch surface of the inner race. In operation, the lubricant moves to the outer zones of the unit under centrifugal force. The bearings, however, in rotating, continually pick up lubricant from the outer race and return it to the inner race, thus assuring that the clutch surface of the inner race is always properly lubricated. One serious defect of known sprag clutches is that the inner race rapidly loses lubricant which is not replaced and such defect is overcome in the unit of the present invention.

Attention is directed to the fact that the lubricant sealing rings are carried by the outer race in grooves, thus providing lubricant tight joints where the sealing rings abut the outer race. Lubricant that is impelled by centrifugal force radially outwardly is thus prevented from escaping from the unit by the tight joint between the sealing rings and the outer race.

From the foregoing description it will be seen that the present invention provides an over-running clutch and bearing assembly meeting the objects and yielding the advantages of the invention. A variety of specific embodiments have been shown and described and it will be appreciated that other variant forms of the invention may be constructed in the light of the foregoing disclosure without departing from the spirit of the invention.

I claim:

1. An over-running clutch and bearing structure comprising: an inner race; an outer race spaced therefrom and concentric therewith; said races providing on their opposed surfaces complementary ball bearing grooves symmetrical with respect to the medial plane of said races that is normal to the axis, and complementary cylindrical clutch surfaces at both sides of said grooves; a plurality of arcuately spaced ball bearings in said grooves rotatingly supporting said outer race on said inner race; a plurality of sprags arranged between said ball bearings, each sprag extending across the space between said grooves and between said clutch surfaces at both sides of said grooves for substantially equal distances on either side of the grooves, said sprags being constructed and arranged to cooperate with said clutch surfaces on both sides of said grooves to jam therebetween when said outer race rotates in a given direction with respect to said inner race and to become disengaged from jamming between said clutch surfaces when said outer race rotates in the opposite direction; and a cage, rotatable independently of said races, providing pockets receiving said ball bearings and other pockets receiving said sprags.

2. An over-running clutch and bearing structure comprising: an inner race; an outer race spaced therefrom and concentric therewith; said races providing on their opposed surfaces complementary ball bearing grooves symmetrical with respect to the medial plane of said races that is normal to the axis, and complementary cylindrical clutch surfaces at both sides of said grooves; a plurality of arcuately spaced ball bearings in said grooves rotatingly supporting said outer race on said inner race; a plurality of sprags arranged between said ball bearings, each sprag across the space between said grooves and between said clutch surfaces at both sides of said grooves for substantially equal distances on either side of the grooves, said sprags being constructed and arranged to cooperate with said clutch surfaces on both sides of said grooves to jam therebetween when said outer race rotates in a given direction with respect to said inner race and to become disengaged from jamming between said clutch surfaces when said outer race rotates in the opposite direction; and a cage, rotatable independently of said races, providing pockets receiving said ball bearings and other pockets receiving said sprags, said cage being formed from right-hand and left-hand sections and having pins extending through said sprag-receiving pockets securing said cage sections together.

References Cited in the file of this patent

UNITED STATES PATENTS

| 1,542,040 | De Lavaud | June 16, 1925 |
| 2,024,486 | Thompson | Dec. 17, 1935 |
| 2,113,722 | Dodge | Apr. 12, 1938 |
| 2,154,212 | Moorhouse | Apr. 11, 1939 |
| 2,360,481 | Dodge | Oct. 17, 1944 |
| 2,365,062 | Dodge | Dec. 12, 1944 |
| 2,423,178 | Dodge | July 1, 1947 |
| 2,762,479 | Ullery | Sept. 11, 1956 |

FOREIGN PATENTS

| 204,620 | Great Britain | Oct. 4, 1923 |
| 644,245 | France | June 4, 1928 |